(12) United States Patent
Sakata

(10) Patent No.: US 11,168,774 B2
(45) Date of Patent: Nov. 9, 2021

(54) ROBOT, FLEXIBLE GEAR, GEARING, AND MANUFACTURING METHOD OF FLEXIBLE GEAR

(71) Applicant: Seiko Epson Corporation, Tokyo (JP)

(72) Inventor: Masaaki Sakata, Matsumoto (JP)

(73) Assignee: Seiko Epson Corporation

( * ) Notice: Subject to any disclaimer, the term of this patent is extended or adjusted under 35 U.S.C. 154(b) by 981 days.

(21) Appl. No.: 15/822,517

(22) Filed: Nov. 27, 2017

(65) Prior Publication Data
US 2018/0149256 A1    May 31, 2018

(30) Foreign Application Priority Data
Nov. 29, 2016   (JP) .............................. JP2016-231615

(51) Int. Cl.
*F16H 49/00* (2006.01)
*B21D 22/28* (2006.01)
*B21D 53/28* (2006.01)
*F16H 55/06* (2006.01)

(52) U.S. Cl.
CPC .......... *F16H 49/001* (2013.01); *B21D 22/28* (2013.01); *B21D 53/28* (2013.01); *F16H 55/06* (2013.01); *F16H 2049/003* (2013.01)

(58) Field of Classification Search
CPC ....................................................... F16H 49/001
USPC ............................................................ 74/640
See application file for complete search history.

(56) References Cited

U.S. PATENT DOCUMENTS

| | | | | |
|---|---|---|---|---|
| 4,715,247 A | * | 12/1987 | Honda | ................. F16H 49/001 384/523 |
| 5,634,377 A | | 6/1997 | Kimura et al. | |
| 10,036,463 B2 | * | 7/2018 | Kunugi | ................ B25J 19/0062 |
| 10,240,032 B2 | * | 3/2019 | Ito | ........................... C22C 38/00 |

FOREIGN PATENT DOCUMENTS

| | | |
|---|---|---|
| JP | 63-008462 U | 1/1988 |
| JP | 07-246579 A | 9/1995 |
| JP | 2016-125099 A | 7/2016 |

* cited by examiner

*Primary Examiner* — Ha Dinh Ho
(74) *Attorney, Agent, or Firm* — Harness, Dickey & Pierce, P.L.C.

(57) ABSTRACT

A robot includes a flexible gear formed by a ferrous material containing at least one or more kinds of elements of Group 4 elements and Group 5 elements in a range from 0.01 percent by mass to 0.5 percent by mass. The ferrous material contains at least one of nickel-chromium-molybdenum steel, maraging steel, and precipitation-hardened stainless steel.

12 Claims, 16 Drawing Sheets

ROBOT, FLEXIBLE GEAR, GEARING, AND MANUFACTURING METHOD OF FLEXIBLE GEAR

BACKGROUND

1. Technical Field

The present invention relates to a robot, flexible gear, gearing, and manufacturing method of the flexible gear.

2. Related Art

In a robot having a robot arm including at least one arm, for example, a joint part of the robot arm is driven by a motor and, generally, the drive power from the motor is reduced by a reducer. As the reducer, a strain wave gearing in which a flexible gear and a rigid gear mesh each other is known (for example see Patent Document 1 (JP-A-7-246579)).

A strain wave gearing of related art has a problem that the flexible gear is readily broken early when used for a robot, for example, because the mechanical strength of the flexible gear is insufficient.

SUMMARY

An advantage of some aspects of the invention is to provide a robot in which the mechanical strength of a flexible gear may be improved, flexible gear, gearing, and manufacturing method of the flexible gear.

The advantage can be achieved by the following configurations.

A robot according to an aspect of the invention includes a flexible gear formed by a ferrous material containing at least one or more kinds of elements of Group 4 elements and Group 5 elements in a range from 0.01 percent by mass to 0.5 percent by mass.

According to the robot having the above described configuration, the flexible gear is formed by the ferrous material containing at least one or more kinds of elements of Group 4 elements and Group 5 elements in the range from 0.01 percent by mass to 0.5 percent by mass. Thereby, even when heat treatment is performed in the manufacturing process of the flexible gear, the growth of the crystal grain of the ferrous material forming the flexible gear may be suppressed and the grain size may be made smaller. Accordingly, the mechanical strength of the flexible gear may be improved.

In the robot according to the aspect of the invention, it is preferable that the ferrous material contains at least one of nickel-chromium-molybdenum steel, maraging steel, and precipitation-hardened stainless steel.

These steels (ferrous materials) have grain sizes that may be easily reduced and achieve a better balance between the mechanical strength and workability. Accordingly, the flexible gear is formed using one of these steels, and thereby, the flexible gear having better properties (mechanical strength, precision, etc.) may be easily realized.

In the robot according to the aspect of the invention, it is preferable that the flexible gear has a tubular barrel portion and a bottom portion connected to one end part of the barrel portion, and the bottom portion has metal flows extending from a center side toward an outer circumference side of the bottom portion.

With this configuration, the metal flows extending from the bottom portion side toward the opening portion side (the opposite side to the bottom portion) of the barrel portion may be formed over the entire range in the circumferential direction of the barrel portion. Accordingly, variations in strength in the circumferential direction of the barrel portion of the flexible gear may be reduced and, as a result, damage of the flexible gear may be reduced.

In the robot according to the aspect of the invention, it is preferable that the metal flows extend radially from the center side toward the outer circumference side of the bottom portion.

With this configuration, the metal flows extending from the bottom portion side toward the opening portion side (the opposite side to the bottom portion) of the barrel portion may be formed over the entire range in the circumferential direction of the barrel portion.

In the robot according to the aspect of the invention, it is preferable that the barrel portion has metal flows extending from one end part side toward the other end part side of the barrel portion.

With this configuration, the toughness in the width direction (radial direction) of the flexible gear may be made better. Further, the tensile strength in the axial direction of the flexible gear may be made better.

In the robot according to the aspect of the invention, it is preferable that the metal flows of the barrel portion extend in directions crossing tooth traces of the flexible gear.

With this configuration, the strength of the teeth of the flexible gear may be made better.

In the robot according to the aspect of the invention, it is preferable that the metal flows of the barrel portion have return portions as seen from a section along an axis line of the barrel portion.

With this configuration, the density of the metal flows in the barrel portion may be increased. As a result, the toughness of the barrel portion may be improved.

In the robot according to the aspect of the invention, it is preferable that the metal flows of the barrel portion extend from the one end part side toward the other end part side of the barrel portion with direction components along a circumferential direction of the bottom portion.

With this configuration, the metal flows of the barrel portion may be extended in the directions crossing the tooth traces of the flexible gear.

In the robot according to the aspect of the invention, it is preferable that the metal flows of the barrel portion have portions curving along shapes of tooth surfaces of the flexible gear as seen from a section along an axis line of the barrel portion.

With this configuration, the strength of the teeth of the flexible gear may be made better.

In the robot according to the aspect of the invention, it is preferable that the metal flows of the barrel portion connect to the metal flows of the bottom portion.

With this configuration, the strength of the part (boundary part) between the bottom portion and the barrel portion of the flexible gear may be made better.

In the robot according to the aspect of the invention, it is preferable that the metal flows of the bottom portion curve and extend from the center side toward the outer circumference side of the bottom portion.

With this configuration, the metal flows of the barrel portion continuously connected to the metal flows of the bottom portion may be extended from one end part side toward the other end part side of the barrel portion with direction components along the circumferential direction of the barrel portion.

A flexible gear according to an aspect of the invention is formed by a ferrous material containing at least one or more kinds of elements of Group 4 elements and Group 5 elements in a range from 0.01 percent by mass to 0.5 percent by mass.

According to the flexible gear having the above described configuration, the mechanical strength of the flexible gear may be improved.

A gearing according to an aspect of the invention includes the flexible gear according to the aspect of the invention.

According to the gearing having the above described configuration, the mechanical strength of the flexible gear may be improved, and thereby, durability of the gearing may be improved.

A manufacturing method of a flexible gear according to an aspect of the invention includes preparing a material formed by a ferrous material containing at least one or more kinds of elements of Group 4 elements and Group 5 elements in a range from 0.01 percent by mass to 0.5 percent by mass, forming a plate body by upset forging of the material, and forming a structure having a tubular portion by deep drawing of the plate body.

According to the manufacturing method of the flexible gear having the above described configuration, the flexible gear having the better mechanical strength may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot, flexible gear, gearing, and manufacturing method of the flexible gear according to the invention will be explained in detail based on embodiments shown in the accompanying drawings.

1. Robot

First, an embodiment of a robot according to the invention will be explained.

Figure 1:
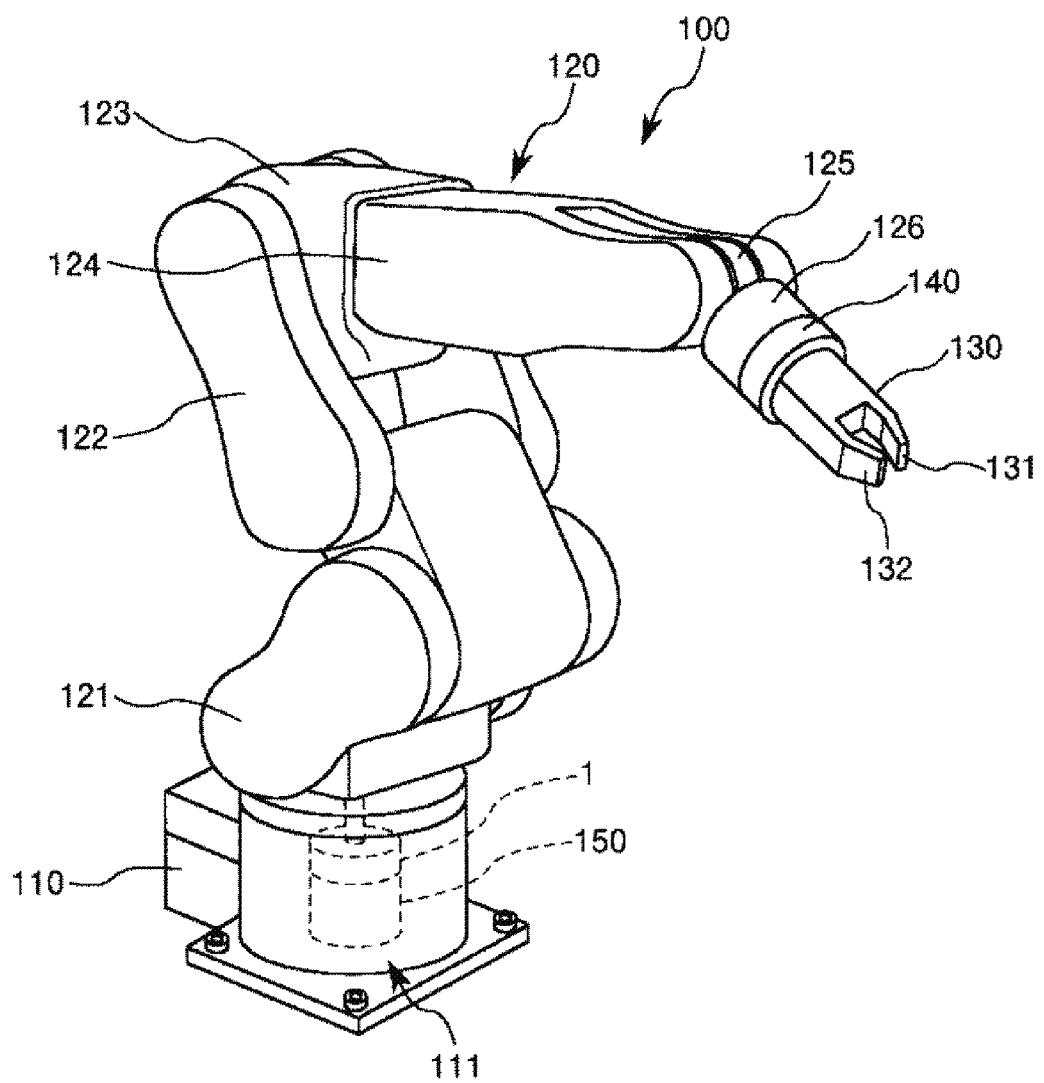
FIG. 1 shows a schematic configuration of an embodiment of a robot according to the invention.

FIG. 1 shows a schematic configuration of the embodiment of the robot according to the invention.

A robot 100 shown in FIG. 1 may perform work of feeding, removing, carrying, assembly, etc. of precision apparatuses and components forming the apparatuses (objects).

The robot 100 is a six-axis vertical articulated robot and has a base 111, a robot arm 120 connected to the base 111, and a force detector 140 and a hand 130 provided in the distal end part of the robot arm 120. Further, the robot 100 has a control apparatus 110 that controls a plurality of drive sources (including a motor 150 and a gearing 1) that generate power for driving the robot arm 120.

The base 111 is a part for attaching the robot 100 to an arbitrary installation location. The installation location of the base 111 is not particularly limited to, but includes a floor, wall, ceiling, movable platform.

The robot arm 120 includes a first arm 121 (arm), a second arm 122 (arm), a third arm 123 (arm), a fourth arm 124 (arm), a fifth arm 125 (arm), and a sixth arm 126 (arm), and the arms are sequentially coupled from the proximal end side toward the distal end side. The first arm 121 is connected to the base 111. The hand 130 (end effector) for grasping e.g. various components or the like is detachably attached to the distal end of the sixth arm 126. The hand 130 has two fingers 131, 132 and may grasp e.g. various components or the like with the fingers 131, 132.

The drive source having the motor 150 such as a servo motor and the gearing 1 (reducer) that drive the first arm 121 is provided. Further, the plurality of drive sources having motors and reducers (not shown) are respectively provided in the respective arms 121 to 126. The respective drive sources are controlled by the control apparatus 110.

In the robot 100, the gearing 1 transmits drive power from one to the other of the base 111 (first member) and the first arm 121 (second member). More specifically, the gearing 1 transmits drive power for rotating the first arm 121 with respect to the base 111 from the base 111 side toward the first arm 121 side. Here, the gearing 1 functions as a reducer, and thereby, reduces the drive power and rotates the first arm 121 with respect to the base 111. Note that "rotation" includes movement in both directions including one direction and the opposite direction with respect to a certain center point and rotation with respect to the certain center point.

In the embodiment, the base 111 is "first member" and the first arm 121 is "second member". Note that "second member" may include an arbitrary number of arms selected among the second to sixth arms 122 to 126 sequentially from the first arm 121 side. That is, a structure including the first arm 121 and the arbitrary number of arms selected among the second to sixth arms 122 to 126 sequentially from the first arm 121 side may be regarded as "second member". For example, a structure including the first, second arms 121, 122 may be regarded as "second member", or the whole robot arm 120 may be regarded as "second member". Or, "second member" may include the hand 130. That is, the structure including the robot arm 120 and the hand 130 may be regarded as "second member".

The above described robot 100 includes the gearing 1 to be described. Thereby, the mechanical strength of a flexible gear 3 of the gearing 1, which will be described later, may be improved.

2. Gearing

As below, embodiments of the gearing according to the invention will be explained.

First Embodiment

Figure 2:
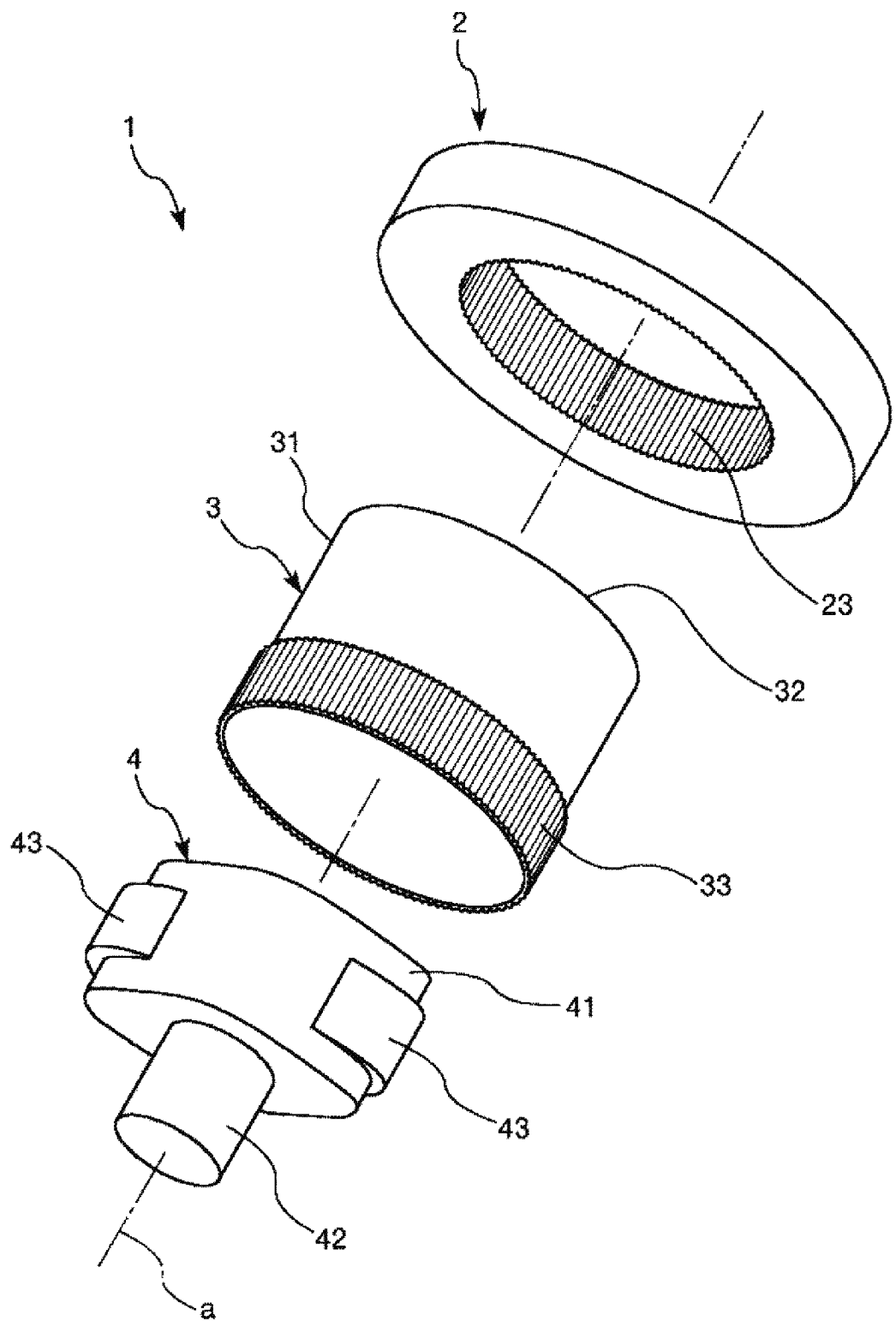
FIG. 2 is an exploded perspective view showing a gearing according to a first embodiment of the invention.
Figure 3:
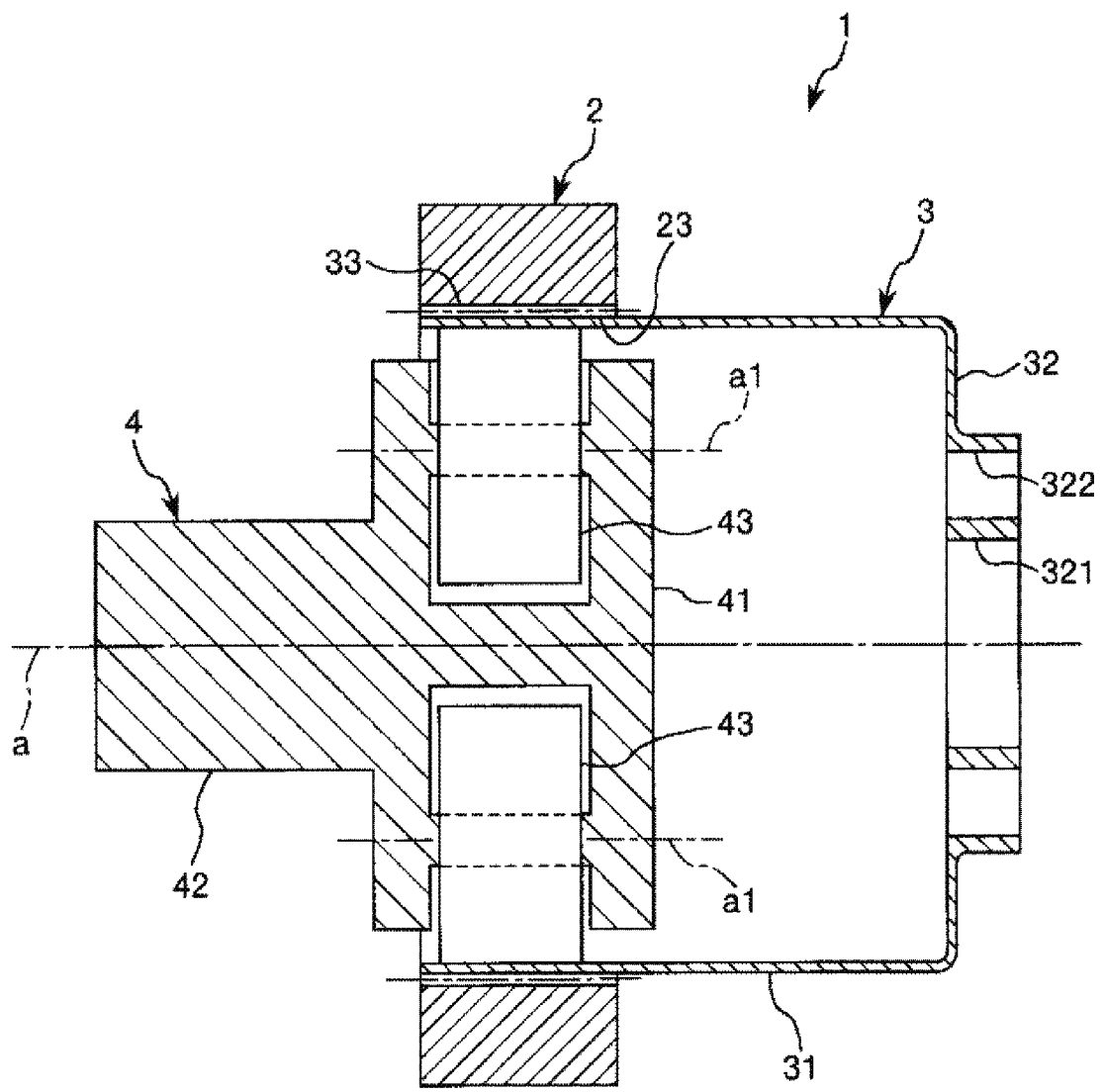
FIG. 3 is a longitudinal sectional view of the gearing shown in FIG. 2.
Figure 4:
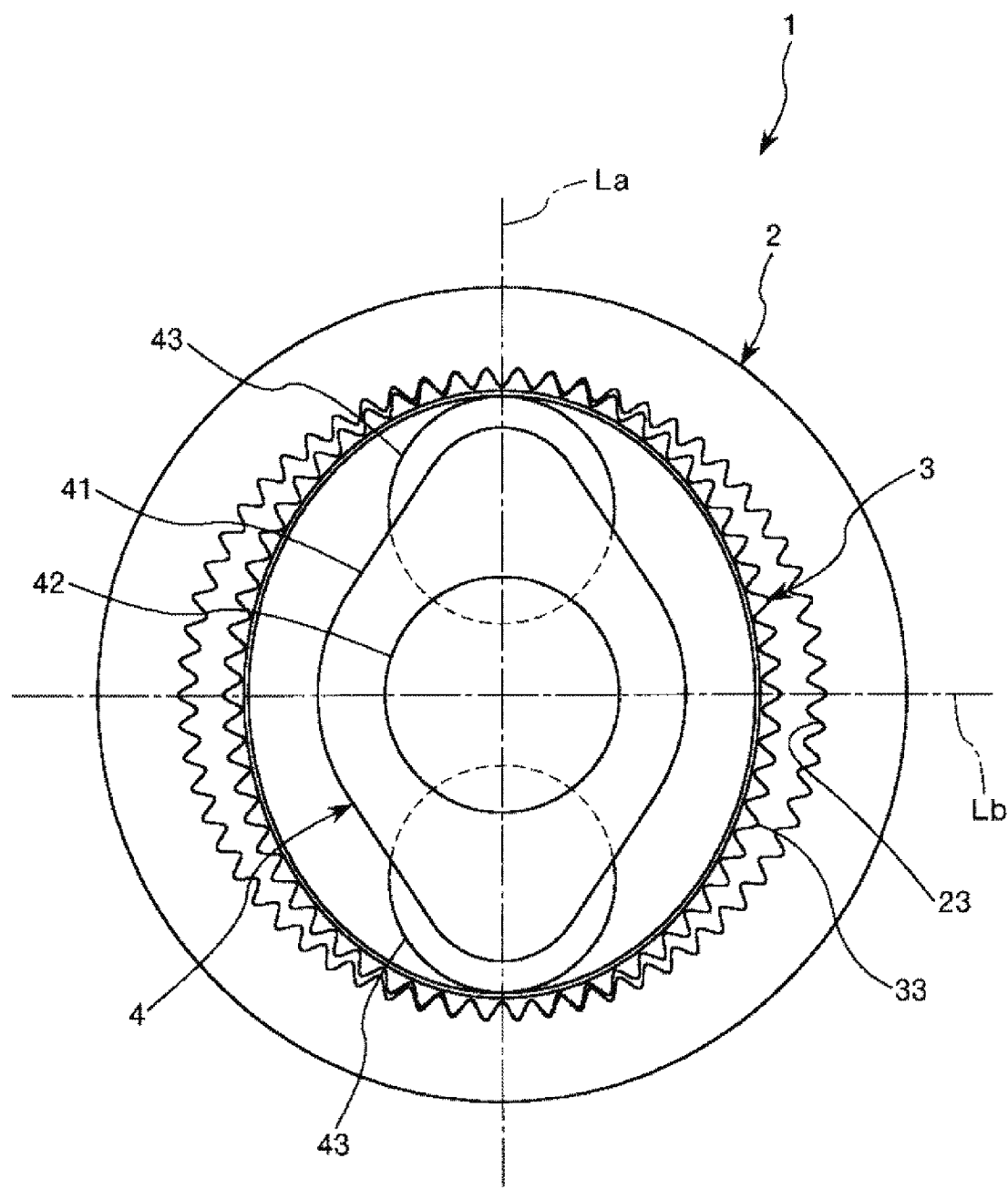
FIG. 4 is a front view of the gearing shown in FIG. 2.
Figure 5:
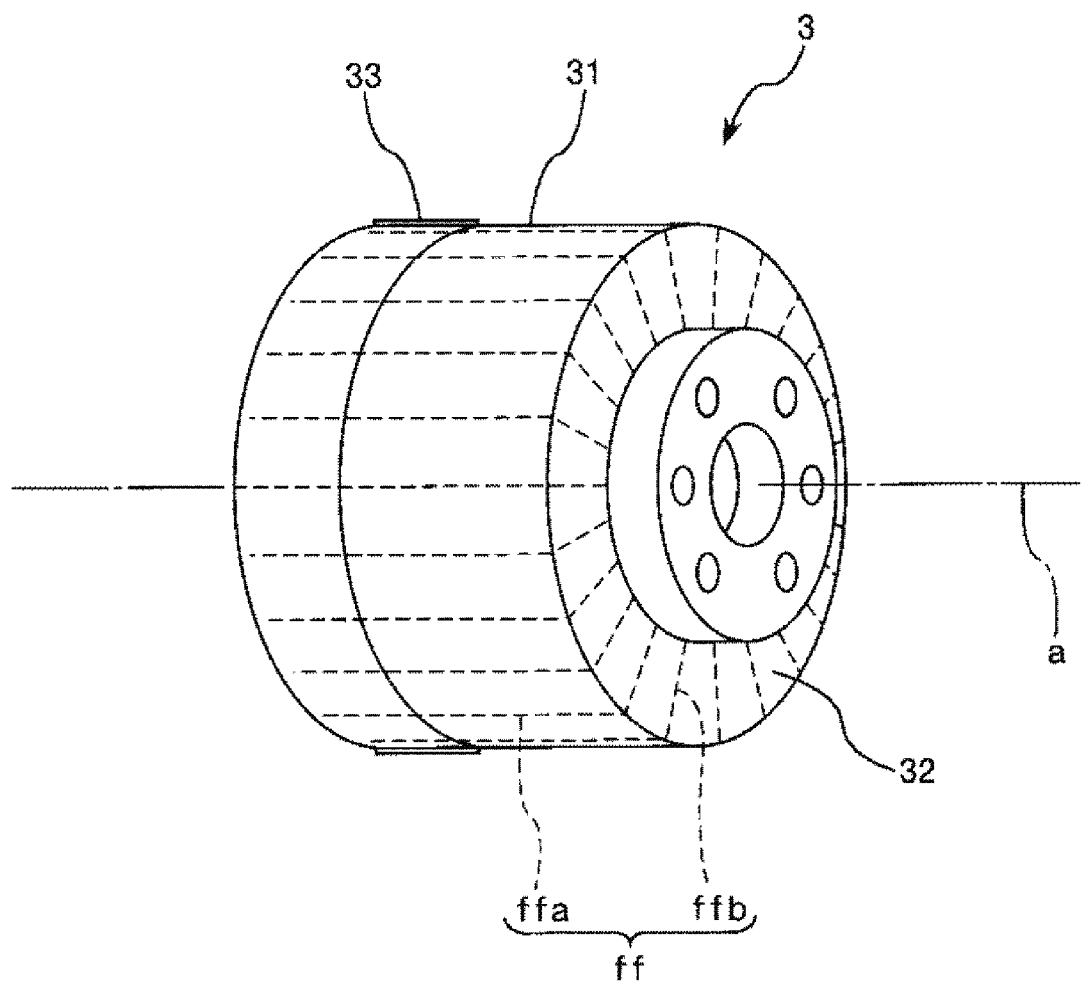
FIG. 5 is a perspective view for explanation of metal flows (fiber flows) of a flexible gear of the gearing shown in FIG. 2.

FIG. 2 is an exploded perspective view showing a gearing according to the first embodiment of the invention. FIG. 3 is a longitudinal sectional view of the gearing shown in FIG. 2. FIG. 4 is a front view of the gearing shown in FIG. 2. FIG. 5 is a perspective view for explanation of metal flows (fiber flows) of a flexible gear of the gearing shown in FIG. 2. Note that, in the respective drawings, for convenience of explanation, the dimensions of the respective parts are shown with appropriate exaggeration as necessary and the dimension ratios between the respective parts are not necessarily the same as the actual dimension ratios. In FIG. 5, for convenience of explanation, illustration of teeth is simplified.

The gearing 1 shown in FIGS. 2 to 4 is a strain wave gearing and used as e.g. a reducer. The gearing 1 has a rigid gear 2 as an internal gear, the flexible gear 3 as a cup-shaped external gear provided inside of the rigid gear 2, and a wave generator 4 provided inside of the flexible gear 3. Further, a lubricant (grease or lubricant oil) (not shown) is appropriately applied to or fills the respective parts of the gearing 1.

In the gearing 1, the cross-sectional surface of the flexible gear 3 has a portion deformed into an elliptical shape or oval shape by the wave generator 4, and the flexible gear 3 meshes with the rigid gear 2 in both end parts on the long axis side of the portion. The numbers of teeth of the rigid gear 2 and the flexible gear 3 differ from each other.

In the gearing 1, for example, when the drive power (e.g. the drive power from the above described motor 150) is input to the wave generator 4, the rigid gear 2 and the flexible gear 3 relatively rotate about an axis line a due to the difference in number of teeth while meshing positions with each other move in the circumferential direction. Thereby, the drive force input from the drive source to the wave generator 4 may be reduced and output from the flexible gear 3. That is, a reducer with the wave generator 4 on the input shaft side and the flexible gear 3 on the output shaft side may be realized.

As below, the respective parts of the gearing 1 will be sequentially explained.

As shown in FIGS. 2 to 4, the rigid gear 2 is a ring-shaped internal gear formed by a rigid body that does not substantially flex in the radial direction and having internal teeth 23. In the embodiment, the rigid gear 2 is a spur gear. That is, the internal teeth 23 have tooth traces parallel to the axis line a. Note that the tooth traces of the internal teeth 23 may be inclined with respect to the axis line a. Therefore, the rigid gear 2 may be a helical gear or double-helical gear.

The flexible gear 3 is inserted into the rigid gear 2. The flexible gear 3 is an external gear having flexibility flexibly deformable in the radial direction and having external teeth 33 that mesh with the internal teeth 23 of the rigid gear 2. The number of teeth of the flexible gear 3 is smaller than the number of teeth of the rigid gear 2. The numbers of teeth of the flexible gear 3 and the rigid gear 2 are different from each other, and thereby, a reducer may be realized.

In the embodiment, the flexible gear 3 has a cup shape with an open end and the external teeth 33 are formed in the end part on the opening side. Here, the flexible gear 3 has a tubular (more specifically, cylindrical) barrel portion 31 (tubular portion) around the axis line a, and a bottom portion 32 connected to one end part side of the barrel portion 31 in the axis line a direction. Thereby, the end part of the barrel portion 31 on the opposite side to the bottom portion 32 may be easily flexed in the radial direction. Accordingly, the flexural meshing of the flexible gear 3 with the rigid gear 2 in a good condition may be realized. Further, the rigidity of the end part of the barrel portion 31 on the bottom portion 32 side may be improved. Therefore, the input shaft or output shaft may be stably connected to the bottom portion 32.

As shown in FIG. 3, a hole 321 penetrating along the axis line a and a plurality of holes 322 penetrating around the hole 321 are formed in the bottom portion 32. The shaft body on the output side may be inserted into the hole 321. Further, the holes 322 may be used as screw holes in which screws for fastening the shaft body on the output side to the bottom portion 32 are inserted. Note that these holes may be provided as appropriate or omitted.

As shown in FIG. 3, the wave generator 4 is provided inside of the flexible gear 3 and rotatable about the axis line a. As shown in FIG. 4, the wave generator 4 deforms the cross-sectional surface of the portion opposite to the bottom portion 32 of the flexible gear 3 into an elliptical shape or oval shape having a long axis La and a short axis Lb and allows the external teeth 33 to mesh with the internal teeth 23 of the rigid gear 2. Here, the flexible gear 3 and the rigid gear 2 mesh with each other rotatably about the same axis line a internally and externally.

In the embodiment, the wave generator 4 has a main body portion 41, a shaft portion 42 projecting along the axis line a from the main body portion 41, and a pair of rollers 43 provided rotatably about an axis line a1 parallel to the axis line a with respect to the main body portion 41. In the wave generator 4, the pair of rollers 43 press out the flexible gear 3 from inside while rolling on the inner circumference surface of the flexible gear 3, so that the main body portion 41, the shaft portion 42, and the pair of rollers 43 can rotate about the axis line a. Therefore, for example, when drive power is input from the drive source to the wave generator 4, the meshing positions of the rigid gear 2 and the flexible gear 3 with each other move in the circumferential direction.

As above, the outline of the gearing 1 is explained. The respective parts of the gearing 1 are formed using e.g. metals. Particularly, the flexible gear 3 (the flexible gear 3 of the above described robot 100) is formed by a ferrous material containing at least one or more kinds of elements of Group 4 elements and Group 5 elements (hereinafter, also simply referred to as "additive element(s)") in a range from 0.01 percent by mass to 0.5 percent by mass. Thereby, even when heat treatment is performed in the manufacturing process of the flexible gear 3, the growth of the crystal grain of the ferrous material forming the flexible gear 3 may be suppressed and the grain size may be made smaller. Accordingly, the mechanical strength of the flexible gear 3 may be improved. According to the gearing 1 having the flexible gear 3, the mechanical strength of the flexible gear 3 is improved, and thereby, durability of the gearing 1 may be improved.

Here, as described above, as the additive element, at least one or more kinds of elements of Group 4 elements and Group 5 elements may be used, however, it is preferable to use one kind of titanium (Ti), zirconium (Zr), hafnium (Hf), vanadium (V), niobium (Nb), tantalum (Ta) singly or two kinds of the elements in combination, it is more preferable that the additive element contains at least one of zirconium (Zr) and niobium (Nb), and it is even more preferable that the additive element contains both zirconium (Zr) and niobium (Nb). Thereby, the effect of suppressing the growth of the crystal grain of the ferrous material forming the flexible gear 3 (hereinafter, also referred to as "crystal grain growth suppression effect") may be exerted more effectively. Note that the constituent material of the flexible gear 3 may contain another element than Group 4 elements or Group 5 elements, e.g. yttrium (Y) in view of effective suppression of the growth of the crystal grain of the ferrous material forming the flexible gear 3.

The content (additive amount) of the additive element in the constituent material of the flexible gear 3 is preferably in a range from 0.05 percent by mass to 0.3 percent by mass and more preferably in a range from 0.1 percent by mass to 0.2 percent by mass. Thereby, the crystal grain growth suppression effect may be exerted more effectively. If the content is too small, the crystal grain growth suppression effect tends to significantly decreases. On the other hand, if the content is too large, the crystal grain growth suppression effect is not larger, toughness of the flexible gear 3 is lower, and the mechanical strength of the flexible gear 3 is lower and workability when the flexible gear 3 is manufactured is extremely worse.

The ferrous material (base material) forming the flexible gear 3 may be a material principally containing iron and containing at least one of e.g. nickel-chromium-molybdenum steel, low-alloy steel, alloy tool steel, high-tensile steel, maraging steel, precipitation-hardened stainless steel, martensitic stainless steel, or the like and preferably containing one of nickel-chromium-molybdenum steel, maraging steel, and precipitation-hardened stainless steel. That is, it is preferable to add the above described additive element to one of nickel-chromium-molybdenum steel, maraging steel, and precipitation-hardened stainless steel. These steels (ferrous materials) have grain sizes that may be easily reduced and achieve a better balance between mechanical strength and workability. Accordingly, the flexible gear is formed using one of these steels, and thereby, the flexible gear 3 having better properties (mechanical strength, precision, etc.) may be easily realized.

Further, the average grain size of the constituent material of the flexible gear 3 is preferably from 0.5 µm to 30 µm, more preferably from 5 µm to 20 µm, and even more preferably from 5 µm to 15 µm. Thereby, the mechanical strength of the flexible gear 3 may be made better. If the average grain size is too small, the workability when the flexible gear 3 is manufactured becomes worse. On the other hand, if the average grain size is too large, it is hard to secure the mechanical strength and toughness necessary for the flexible gear 3.

In order to exert the effect of improving the mechanical strength more effectively by reducing the grain size as described above, the flexible gear 3 has metal flows ff in directions as shown by broken lines in FIG. 5. The metal flows ff have metal flows ffb radially extending from the center side toward the outer circumference side of the bottom portion 32 in the bottom portion 32 and metal flows ffa extending from one end part side toward the other end part side of the barrel portion 31 in the barrel portion 31. Note that, in the specification, "metal flows" refer to flows of metal particles or metallographic structures and the forming method is not limited to forging. Particularly, the metal flows formed by forging are referred to as "fiber flows".

In the embodiment, the metal flows ff have shapes along the cup shape from the bottom portion 32 side toward the barrel portion 31 of the flexible gear 3. Therefore, the metal flows ffa of the barrel portion 31 connect to the metal flows ffb of the bottom portion 32. That is, the metal flows ff continuously extend over the barrel portion 31 and the bottom portion 32. Note that the metal flows ffa may be discontinuous with the metal flows ffb.

Further, in the embodiment, the metal flows ffb of the bottom portion 32 linearly extend from the center side toward the outer circumference side of the bottom portion 32. Further, the metal flows ffa of the barrel portion 31 linearly extend in the directions parallel to the axis line a. Though not shown in FIG. 5, the metal flows ffa of the barrel portion 31 have return portions (see return portions R shown in FIG. 11, which will be described later) as seen in the section along the axis line a of the barrel portion 31.

As described above, the bottom portion 32 of the flexible gear 3 has the metal flows ffb radially extending from the center side toward the outer circumference side of the bottom portion 32, and thereby, the metal flows ffa extending from the bottom portion 32 side toward the opening portion side (the opposite side to the bottom portion 32) of the barrel portion 31 may be formed over the entire range in the circumferential direction of the barrel portion 31. Accordingly, variations in strength in the circumferential direction of the barrel portion 31 of the flexible gear 3 may be reduced and, as a result, damage of the flexible gear 3 may be reduced.

In the embodiment, the barrel portion 31 has the metal flows ffa extending from the one end part side toward the other end part side of the barrel portion 31, and thereby, the toughness in the width direction (radial direction) of the flexible gear 3 may be made better. Further, the tensile strength in the axial direction of the flexible gear 3 (the direction parallel to the axis line a) may be made better. Here, in view of effective reduction of the variations in strength in the circumferential direction of the barrel portion 31 of the flexible gear 3, it is preferable that density of the metal flows ffa is as uniform as possible over the entire range in the circumferential direction of the barrel portion 31.

Further, the metal flows ffa of the barrel portion 31 connect to the metal flows ffb of the bottom portion 32, and thereby, the strength of the part (boundary part) between the bottom portion 32 and the barrel portion 31 of the flexible gear 3 may be made better. Accordingly, prevention of cracking, improvement in bending rigidity, improvement in fatigue strength, etc. of the outer circumferential part (corner part) of the bottom portion 32 of the cup-shaped flexible gear 3 may be realized.

The above described flexible gear 3 may be manufactured in the following manner.

Manufacturing Method of Flexible Gear

As below, a manufacturing method of a flexible gear according to the invention will be explained by taking the case of manufacturing the above described flexible gear 3 as an example.

Figure 6:
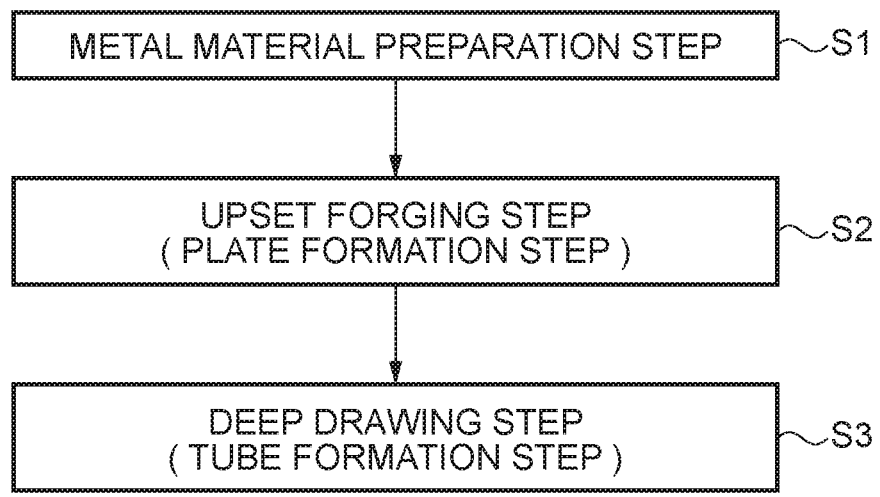
FIG. 6 is a flowchart for explanation of a manufacturing method of the flexible gear shown in FIG. 5.
Figure 7:
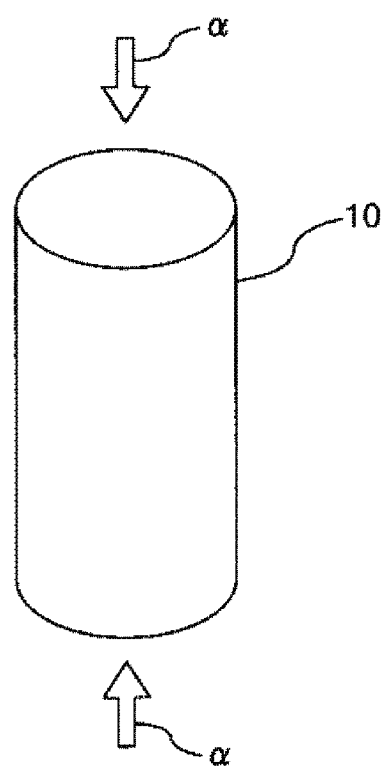
FIG. 7 is a perspective view showing a metal material (block body) used for a metal material preparation step shown in FIG. 6.
Figure 8:
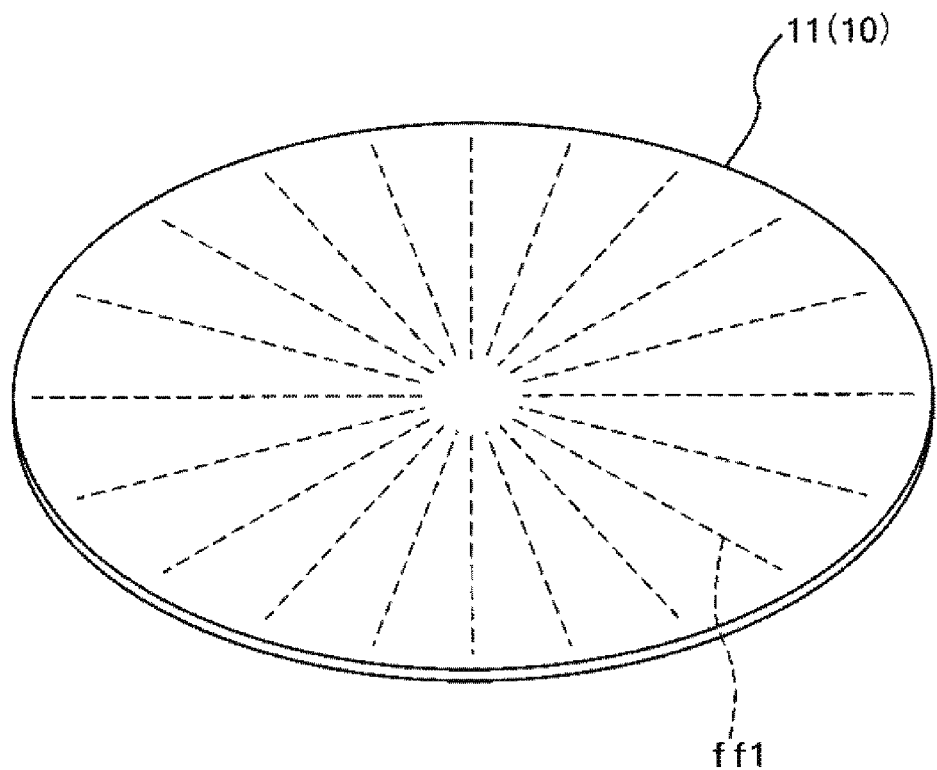
FIG. 8 is a perspective view showing a plate body obtained at an upset forging step shown in FIG. 6.
Figure 9:
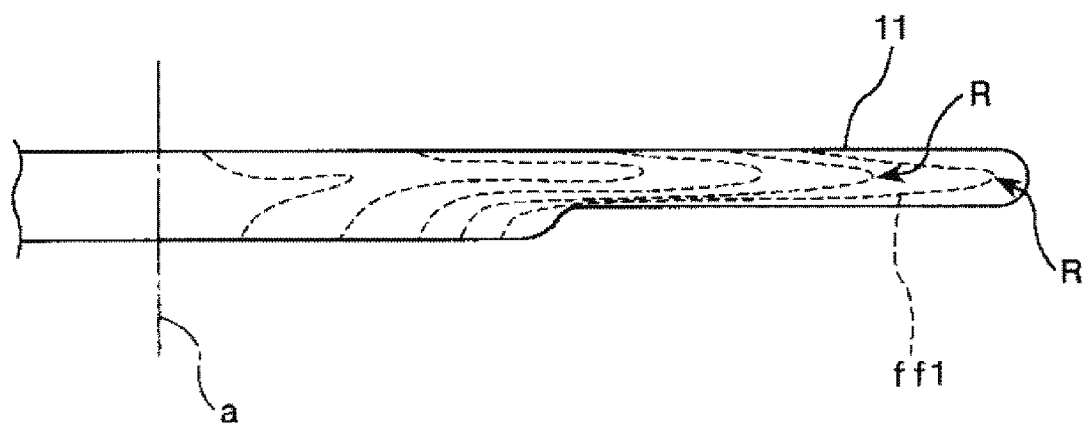
FIG. 9 is a sectional view for explanation of metal flows of the plate body shown in FIG. 8.
Figure 10:
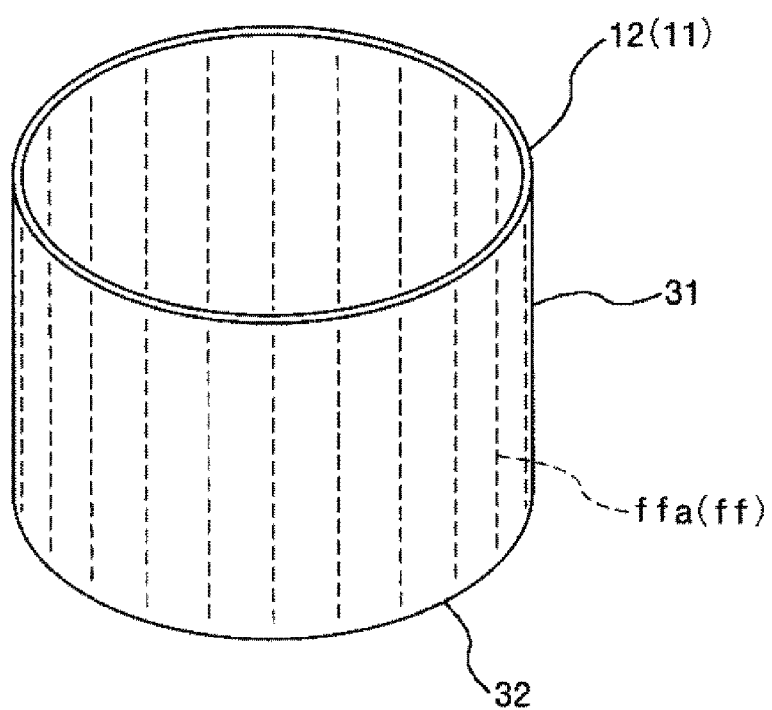
FIG. 10 is a perspective view showing a tubular body obtained at a deep drawing step shown in FIG. 6.
Figure 11:
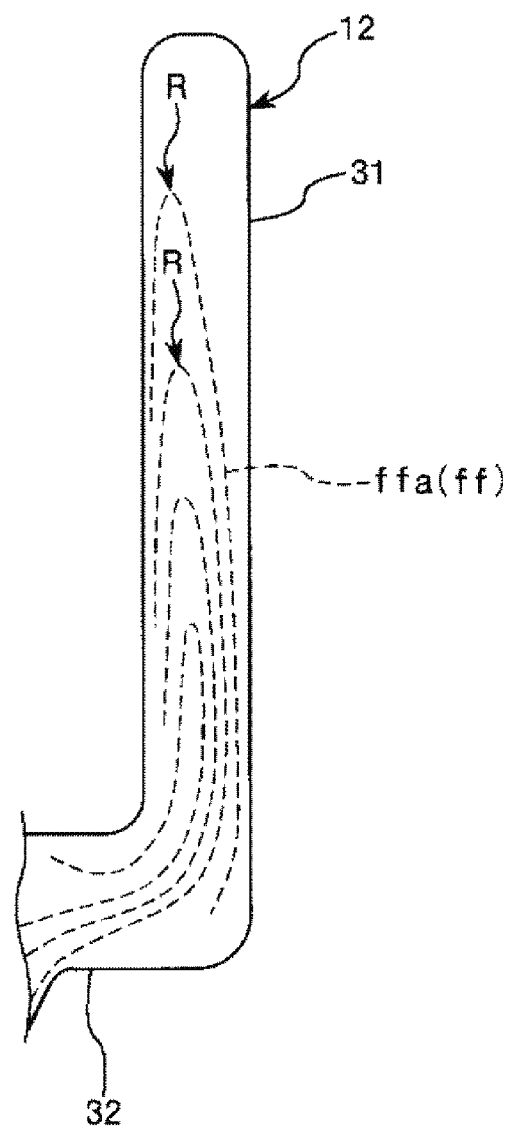
FIG. 11 is a partial sectional view for explanation of metal flows of the tubular body shown in FIG. 10.

FIG. 6 is a flowchart for explanation of a manufacturing method of the flexible gear shown in FIG. 5. FIG. 7 is a perspective view showing a metal material (block body) used for a metal material preparation step shown in FIG. 6. FIG. 8 is a perspective view showing a plate body obtained at an upset forging step shown in FIG. 6. FIG. 9 is a sectional view for explanation of metal flows of the plate body shown in FIG. 8. FIG. 10 is a perspective view showing a tubular body obtained at a deep drawing step shown in FIG. 6. FIG. 11 is a partial sectional view for explanation of metal flows of the tubular body shown in FIG. 10.

As shown in FIG. 6, the manufacturing method of the flexible gear 3 has [1] metal material preparation step (step S1), [2] upset forging step (step S2), and [3] deep drawing step (step S3). As below, the respective steps will be sequentially explained.

[1] Metal Material Preparation Step (Step S1)

First, as shown in FIG. 7, a material 10 is prepared. The material 10 is formed by a ferrous material containing at least one or more kinds of elements of Group 4 elements and Group 5 elements in a range from 0.01 percent by mass to 0.5 percent by mass. In the embodiment, the material 10 has a cylinder shape. Thereby, a plate body (plate member) obtained at [2] upset forging step to be described later may be formed in a circular disc shape and an unnecessary part of a structure obtained at [3] deep drawing step may be made smaller. Note that the shape of the material 10 is not limited to the cylinder shape, but may be a polygonal shape, cubic shape, block shape, or the like.

The constituent material of the material 10 is not particularly limited, but various metals may be used. The material 10 does not necessarily have metal flows, but it is preferable that the material is formed by drawing and has metal flows in a direction along the pressurizing directions (directions α shown in FIG. 7) at [2] upset forging step to be described later. Thereby, the metal flows (fiber flows) formed in the plate body obtained at [2] upset forging step may be easily spread radially from the center side toward the outer circumference side of the plate body. Further, high-density metal flows may be formed by formation of the return portions R to be described later.

[2] Upset Forging Step (Step S2)

Then, the material 10 is upset forged. In this regard, pressure is applied in the axis line direction (the direction a shown in FIG. 7) of the cylindrical material 10. Thereby, as shown in FIG. 8, a disc-shaped plate body 11 is formed.

As shown in FIG. 8, in the plate body 11, metal flows ff1 (fiber flows) radially spreading from the center side toward the outer circumference side of the disc-shaped plate body 11 are formed. Further, as shown in FIG. 9, when the plate body 11 is seen in a section along the axis line a (center axis), the metal flows ff1 have return portions R returning to be convex toward the outer circumference side of the plate body 11.

The upset forging at the step may be performed in a cold or hot condition, and a hot condition is preferable in view of workability. Here, even when the upset forging is performed in a hot condition, the crystal grain in the obtained plate body 11 may be made smaller because the material 10 contains the above described additive element.

[3] Deep Drawing Step (Step S3)

Then, the plate body 11 is deep drawn and, as shown in FIG. 10, a tubular body 12 (structure) having the barrel portion 31 (tubular portion) and the bottom portion 32 is formed. In this regard, with the formation of the tubular body 12, the metal flows ff1 of the above described plate body 11 are deformed into the metal flows ff. Thereby, the tubular body 12 has the metal flows ff.

The metal flows ff of the tubular body 12 are derived from the metal flows ff1 of the plate body 11, and thus, as shown in FIG. 11, the metal flows ffa of the barrel portion 31 of the tubular body 12 have the return portions R as seen in the section along the axis line a of the barrel portion 31. Thereby, the density of the metal flows ff in the barrel portion 31 may be increased. As a result, the toughness of the barrel portion 31 may be improved.

The deep drawing at the step may be performed in a cold or hot condition, but a hot condition is preferable in view of workability. Here, even when the deep drawing is performed in a hot condition, the crystal grain in the obtained tubular body 12 may be made smaller because the material 10 (plate body 11) contains the above described additive element.

Thus formed tubular body 12 is appropriately processed and the flexible gear 3 is formed. For example, after the formation of the tubular body 12, a step of removing unnecessary parts by cutting or the like, a step of forming the external teeth 33, etc. are performed. Thereby, the flexible gear 3 having better dimension accuracy may be obtained. Note that the tubular body 12 may be the flexible gear 3. In this case, processing after the formation of the tubular body 12 is not necessarily performed.

The method of forming the external teeth 33 after the formation of the tubular body 12 is not particularly limited to, but includes cutting and rolling. Rolling is preferably used. Thereby, the metal flows ff may be deformed along the shapes of the external teeth 33 and interruption of the metal flows ff in the external teeth 33 may be reduced. As a result, the mechanical strength of the external teeth 33 may be improved.

The flexible gear 3 may be manufactured in the above described manner. As described above, the manufacturing method of the flexible gear 3 includes the step [1] of preparing the material 10 formed by the ferrous material containing at least one or more kinds of elements of Group 4 elements and Group 5 elements in a range from 0.01 percent by mass to 0.5 percent by mass, the step [2] of forming the plate body 11 by upset forging of the material 10, and the step [3] of forming the tubular body 12 as "structure" having the tubular portion by deep drawing of the plate body 11. Thereby, the flexible gear 3 having the better mechanical strength may be obtained. Particularly, the material 10 is formed by the ferrous material containing at least one or more kinds of elements of Group 4 elements and Group 5 elements in a range from 0.01 percent by mass to 0.5 percent by mass, and thus, the crystal grain of the material 10 may be made smaller and, even when heat treatment is performed at the subsequent respective steps, the growth of the crystal grain may be suppressed and the grain size of the crystal grain of the finally obtained flexible gear 3 may be also made smaller. Accordingly, the mechanical strength of the flexible gear 3 may be made better.

Second Embodiment

Next, the second embodiment of the invention will be explained.

Figure 12:
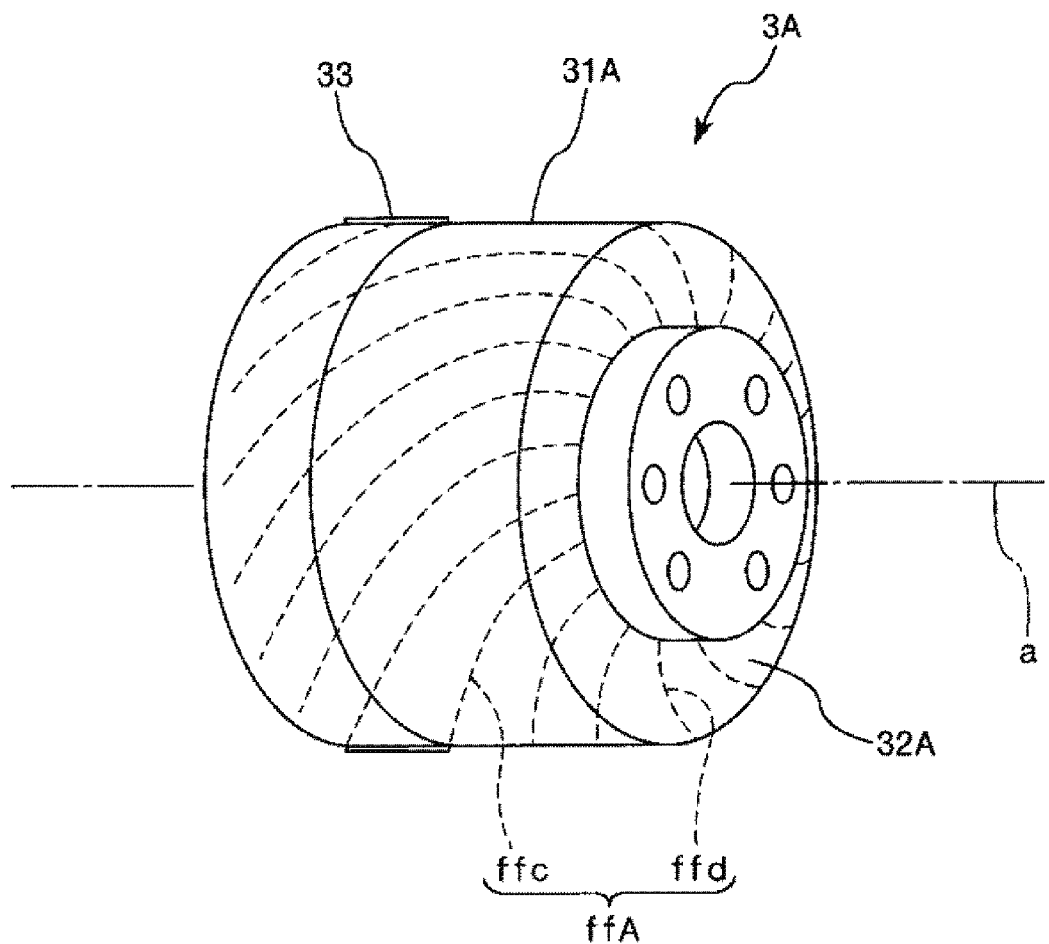
FIG. 12 is a perspective view for explanation of metal flows (fiber flows) of a flexible gear of a gearing according to a second embodiment of the invention.

FIG. 12 is a perspective view for explanation of metal flows (fiber flows) of a flexible gear of a gearing according to the second embodiment of the invention. Note that, in FIG. 12, for convenience of explanation, illustration of teeth is simplified.

The embodiment is the same as the above described first embodiment except that the shapes of the metal flows of the flexible gear are different.

In the following description, the embodiment will be explained with a focus on the differences from the above described embodiment and the explanation of the same items will be omitted. Further, in FIG. 12, the same configurations as those of the above described embodiment have the same signs.

A flexible gear 3A of the embodiment has a tubular barrel portion 31A and a bottom portion 32A connected to one end part side of the barrel portion 31A. Further, the flexible gear 3A has metal flows ffA in directions as shown by broken lines in FIG. 12. The metal flows ffA have metal flows ffd radially extending from the center side toward the outer circumference side of the bottom portion 32A in the bottom portion 32A and metal flows ffc extending from one end part side toward the other end par side of the barrel portion 31A in the barrel portion 31A.

In the embodiment, the metal flows ffd of the bottom portion 32A curve and extend from the center side toward the outer circumference side of the bottom portion 32A. Therefore, the metal flows ffd of the bottom portion 32A extend from the center side toward the outer circumference side of the bottom portion 32A with direction components along the circumferential direction of the bottom port ion 32A. Further, the metal flows ffc of the barrel portion 31A curve and extend from the bottom portion 32A side toward the external teeth 33 side along the circumferential direction of the barrel portion 31A. Therefore, the metal flows ffc of the barrel portion 31A extend from one end part side toward the other end part side of the barrel portion 31A with direction components along the circumferential direction of the barrel portion 31A.

Here, the metal flows ffd of the bottom portion 32A curve and extend from the center side toward the outer circumference side of the bottom portion 32A, and thereby, the metal flows ffc of the barrel portion 31A continuously connected to the metal flows ffd of the bottom portion 32A may be extended from one end part side toward the other end part side of the barrel portion 31A with direction components along the circumferential direction of the barrel portion 31A.

On the other hand, as described above, the external teeth 33 have tooth traces parallel to the axis line a. Accordingly, the metal flows ffc of the barrel portion 31A extend in directions crossing the tooth traces of the flexible gear 3A. Thereby, the strength of the external teeth 33 of the flexible gear 3A may be made better.

As described above, the metal flows ffc of the barrel portion 31A extend from one end part side toward the other end part side of the barrel portion 31A with direction components along the circumferential direction of the barrel portion 31A, and thereby, the metal flows ffc of the barrel portion 31A may be extended in the directions crossing the tooth traces of the flexible gear 3A. Note that, in the viewpoint, when the tooth traces of the flexible gear 3A incline with respect to the axis line a, it is preferable that the metal flows ffc curve or incline toward the side to which angles formed by the tooth traces and the metal flows ffc are larger.

Further, it is preferable that the metal flows ffc of the barrel portion 31A may deform to undulate along the shapes of the tooth surfaces of the flexible gear 3A, i.e., have portions curving along the shapes of the tooth surfaces of the flexible gear 3A as seen in the section crossing the axis line of the barrel portion 31A. Thereby, the strength of the external teeth 33 of the flexible gear 3A may be made better.

The above described flexible gear 3A may be manufactured by the following manner.

Figure 13:
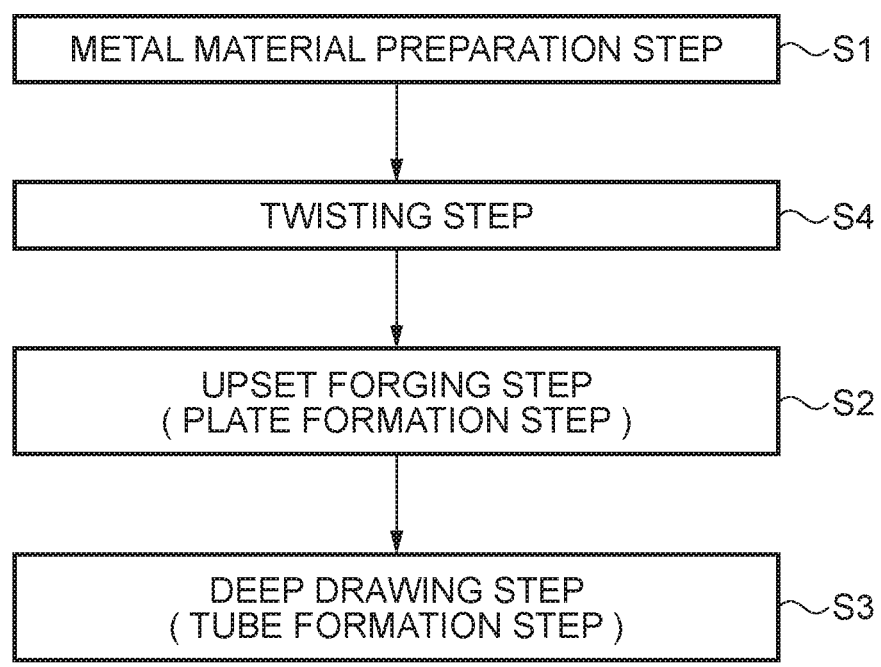
FIG. 13 is a flowchart for explanation of a manufacturing method of the flexible gear shown in FIG. 12.
Figure 14:
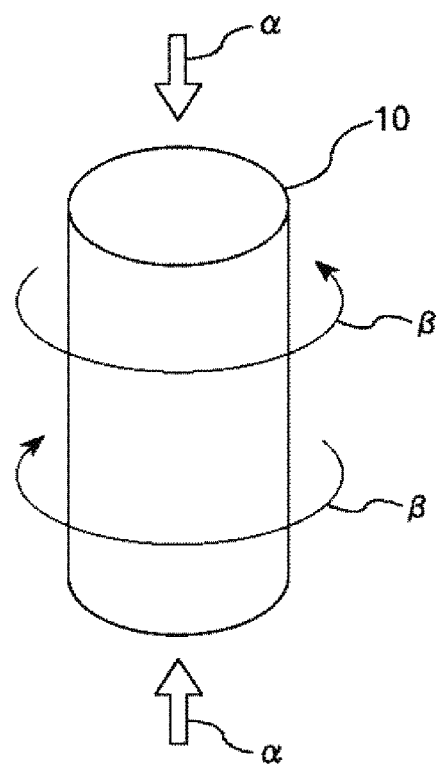
FIG. 14 is a perspective view for explanation of a twisting step shown in FIG. 13.
Figure 15:
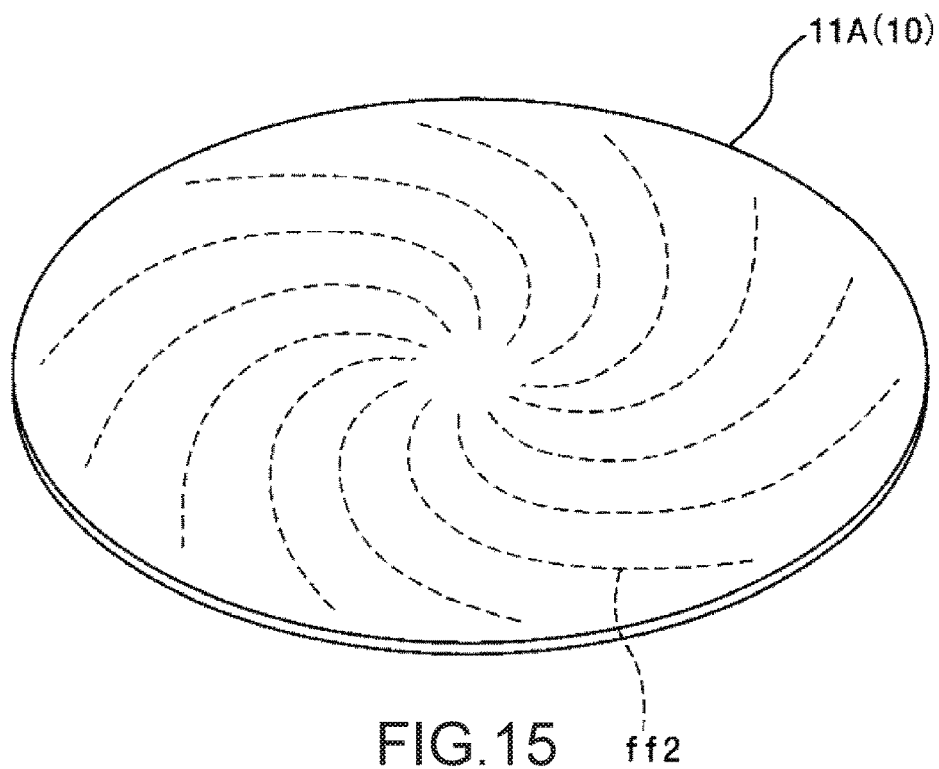
FIG. 15 is a perspective view showing a plate body obtained at an upset forging step shown in FIG. 13.
Figure 16:
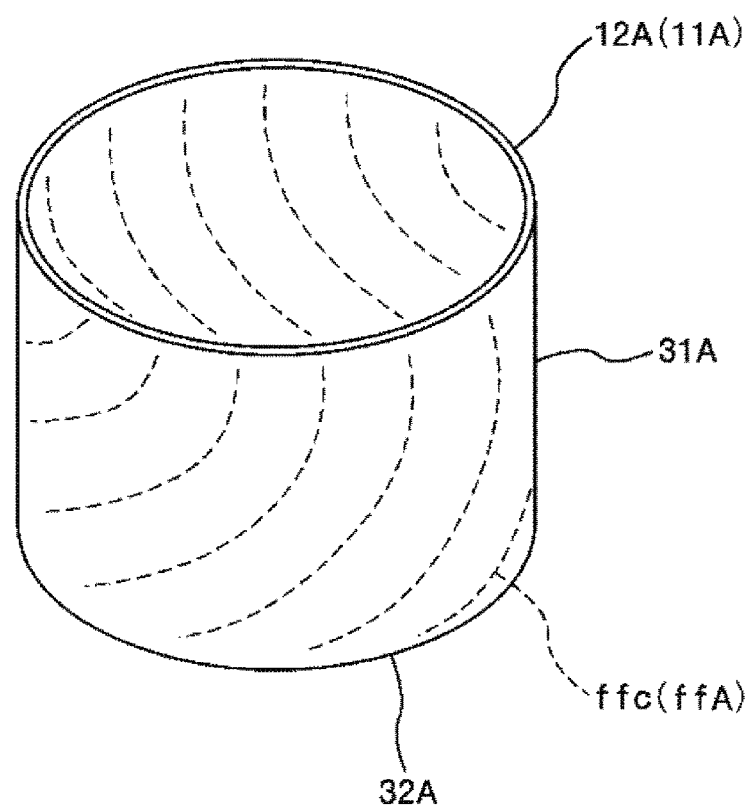
FIG. 16 is a perspective view showing a tubular body obtained at a deep drawing step shown in FIG. 13.

FIG. 13 is a flowchart for explanation of a manufacturing method of the flexible gear shown in FIG. 12. FIG. 14 is a perspective view for explanation of a twisting step shown in FIG. 13. FIG. 15 is a perspective view showing a plate body obtained at an upset forging step shown in FIG. 13. FIG. 16 is a perspective view showing a tubular body obtained at a deep drawing step shown in FIG. 13.

As shown in FIG. 13, the manufacturing method of the flexible gear 3A has [1] metal material preparation step (step S1), [1A] twisting step (step S4), [2] upset forging step (step S2), and [3] deep drawing step (step S3). That is, the manufacturing method of the flexible gear 3A has [1A] twisting step between the [1] metal material preparation step and [2] upset forging step in the above described manufacturing method of the flexible gear 3 of the above described first embodiment.

At [1A] twisting step, the material 10 is twisted. In this regard, rotation forces in opposite directions to each other (directions β shown in FIG. 14) are applied to both end portions of the cylindrical material 10 about the axis line. The twisting may be performed in a cold or hot condition. Or, the twisted material 10 may be obtained by twisting of an elongated rod material and cutting the rod material into necessary lengths. In this case, many twisted materials 10 may be efficiently produced.

Then, [2] upset forging step is performed and a plate body 11A is formed. In the plate body 11A, as shown in FIG. 15, metal flows ff2 (fiber flows) curving and radially spreading from the center side toward the outer circumference side of the disc-shaped plate body 11A are formed. Note that [2] upset forging step may be performed at the same time as or to overlap with the above described [1A] twisting step.

Then, [3] deep drawing step is performed and a tubular body 12A (structure) having the barrel portion 31A (tubular portion) and the bottom portion 32A is formed. In this regard, with the formation of the tubular body 12A, the metal flows ff2 of the above described plate body 11A are deformed into the metal flows ffA. Thereby, the tubular body 12A has the metal flows ffA.

Rolling is used as the method of forming the external teeth 33 after the formation of the tubular body 12A, and thereby, the metal flows ffA may be deformed along the shapes of the external teeth 33 (the shapes of the tooth surfaces) and the mechanical strength of the external teeth 33 may be made particularly better.

Third Embodiment

Next, the third embodiment of the invention will be explained.

Figure 17:
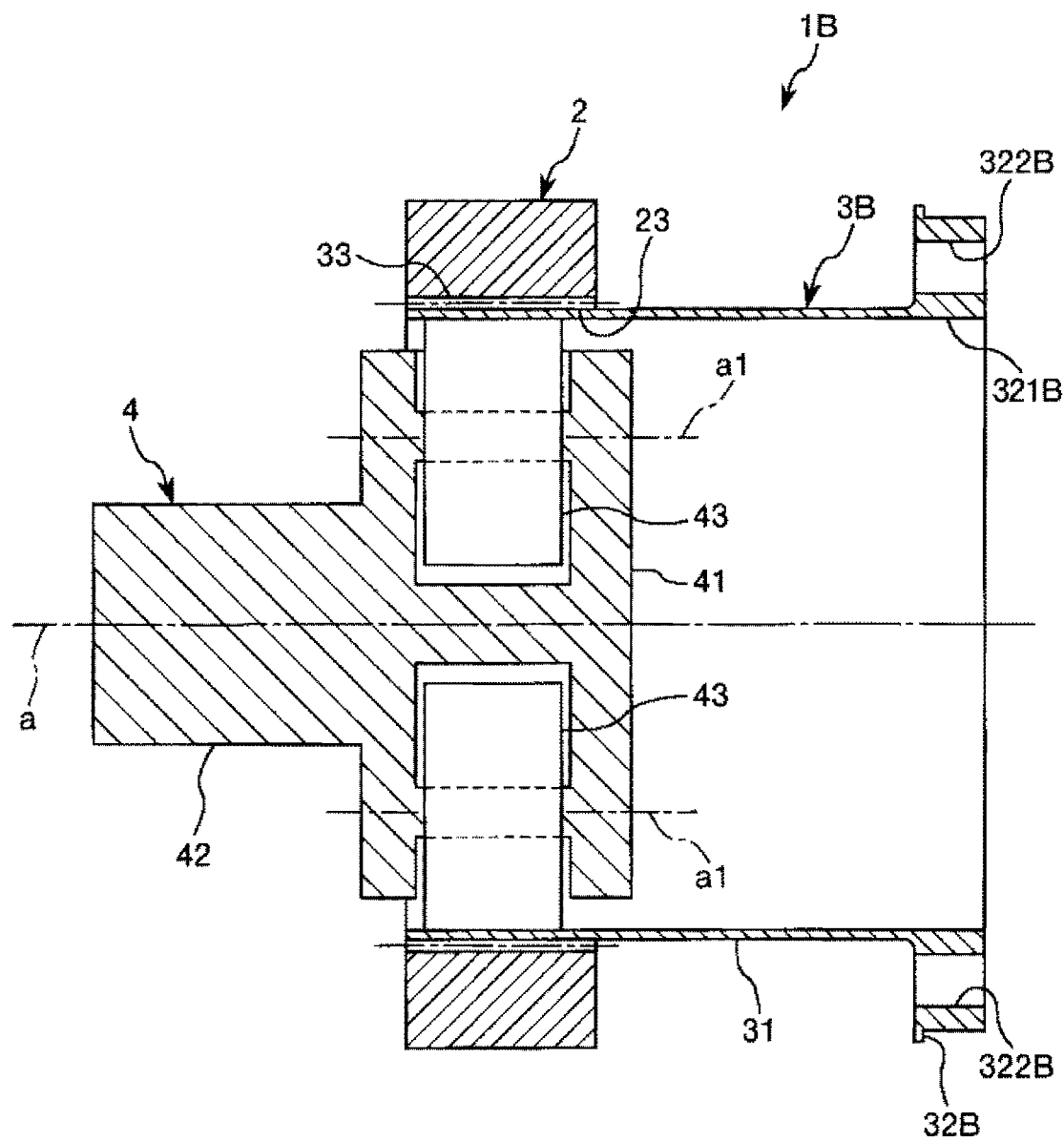
FIG. 17 is a longitudinal sectional view showing a gearing according to a third embodiment of the invention.
Figure 18:
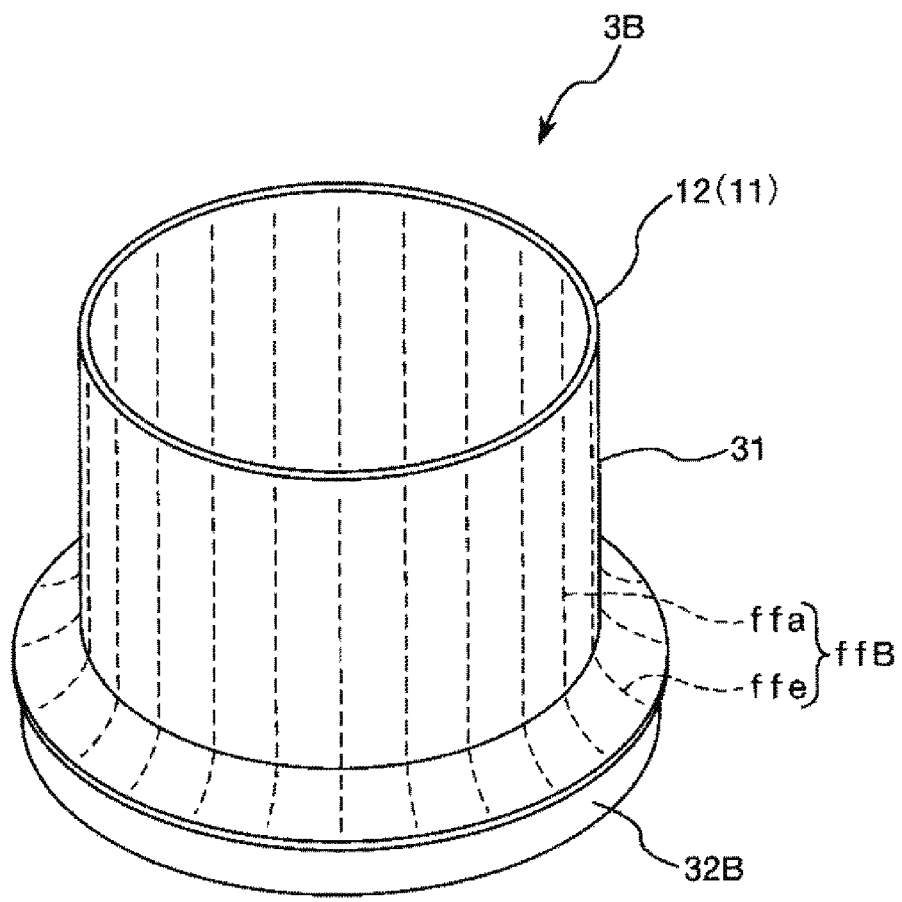
FIG. 18 is a perspective view for explanation of metal flows (fiber flows) of a flexible gear of the gearing shown in FIG. 17.

FIG. 17 is a longitudinal sectional view showing a gearing according to the third embodiment of the invention. FIG. 18 is a perspective view for explanation of metal flows (fiber flows) of a flexible gear of the gearing shown in FIG. 17. Note that, in FIG. 18, for convenience of explanation, illustration of teeth is omitted.

In the following description, the embodiment will be explained with a focus on the differences from the above described embodiments and the explanation of the same items will be omitted.

A gearing 1B shown in FIG. 17 has a flexible gear 3B as a hat-shaped external gear provided inside of the rigid gear 2.

The flexible gear 3B has a flange portion 32B connected to one end part of the tubular barrel portion 31 and projecting toward the opposite side to the axis line a. In the flange portion 32B, a plurality of holes 322B penetrating along the axis line a are formed. The holes 322B may be used as screw holes in which screws for fastening the shaft body on the output side to the flange portion 32B. Further, the shaft body on the output side may be inserted into an inner circumference part 321B of the flange portion 32B.

The flexible gear 3B has metal flows ffB in directions as shown by broken lines in FIG. 18. The metal flows ffB have metal flows ffe radially extending from the inner circumference side toward the outer circumference side of the flange portion 32B in the flange portion 32B and metal flows ffa extending from one end part side toward the other end part side of the barrel portion 31 in the barrel portion 31. The metal flows ffe are provided, and thereby, the metal flows ffa extending from the flange portion 32B side toward the opening portion side (the opposite side to the flange portion 32B) of the barrel portion 31 may be formed over the entire range in the circumferential direction of the barrel portion 31. Accordingly, variations in strength in the circumferential direction of the barrel portion 31 of the flexible gear 3B may be reduced and, as a result, damage of the flexible gear 3B may be reduced.

The flexible gear 3B having the above described configuration may be manufactured by formation of a tubular body by deep drawing after upset forging of a metal material and processing as appropriate like the flexible gear 3 of the above described first embodiment. In this regard, for example, the deep drawing may be performed so that the outer circumference part of the plate body obtained by upset forging may be the flange portion 32B. In this case, for example, it is preferable to remove the center part of the plate body before the deep drawing.

As above, the robot, flexible gear, gearing, and manufacturing method of the flexible gear according to the invention are explained with reference to the illustrated embodiments, however, the invention is not limited to those. The configurations of the respective parts may be replaced by arbitrary configurations having the same functions. Further, other arbitrary configurations may be added to the invention. Furthermore, the respective embodiments may be appropriately combined.

In addition, an arbitrary step may be added to the manufacturing method of the flexible gear according to the invention.

In the above described embodiments, the gearing in which the base of the robot is "first member" and the first arm is "second member" and drive power is transmitted from the first member to the second member is explained, however, the invention is not limited to that. The invention can be applied to a gearing in which the nth (n is an integer equal to or larger than one) arm is "first member" and the (n+1)th arm is "second member" and drive power is transmitted from one of the nth arm and the (n+1)th arm to the other. Further, the invention can be applied to a gearing in which drive power is transmitted from the second member to the first member.

In the above described embodiments, the six-axis vertical articulated robot is explained, however, the invention is not limited to that as long as the robot uses a gearing having a flexible gear. For example, the number of joints of the robot is arbitrary and the invention can be applied to a horizontal articulated robot.

EXAMPLES

As below, specific examples of the invention will be explained.
1. Manufacture of Gearings (Reducers)

Example 1

A gearing having the configuration as shown in FIG. 2 was manufactured.

Here, regarding the manufactured gearing, the outer diameter of the internal gear was ϕ60, the inner diameter of the internal gear (rigid gear) and the outer diameter of the external gear (flexible gear) (meshing reference circle diameter) were ϕ45, and the reduction ratio was 50. Further, cast iron was used as the constituent material of the internal gear and nickel-chromium-molybdenum steel (SNCM439) was used as the base material (ferrous material) of the external gear. 0.01 percent by mass of Niobium (Nb) as the additive element was added to the constituent material (base material) of the external gear. The manufacture of the flexible gear was performed as is the case of the above described first embodiment, by preparing the material, forming the plate member by upset forging of the material in a hot condition, and forming the tubular body by deep drawing of the plate member in a hot condition. Then, the outer shape of the tubular body was shaped by cutting, and then, the external teeth were formed by rolling.

Examples 2 to 13

Reference Examples 1, 2

The gearings of Examples 2 to 13 and Reference Examples 1, 2 were manufactured in the same manner as that of the above described example 1 except the base materials (ferrous materials) of the flexible gears and the additive elements and the additive amounts shown in Table 1.

TABLE 1

| | Flexible Gear | | | Evaluation | |
| --- | --- | --- | --- | --- | --- |
| | Base material | Additive Element | Additive amount [% by mass] | Grain size [μm] | Life [revolutions] |
| Example 1 | SNCM439 | Nb | 0.01 | 15 | $7 \times 10^7$ |
| Example 2 | SNCM439 | Nb | 0.05 | 10 | $8 \times 10^7$ |
| Example 3 | SNCM439 | Nb | 0.1 | 8 | $1 \times 10^8$ |
| Example 4 | SNCM439 | Nb | 0.2 | 6 | $8 \times 10^7$ |
| Example 5 | SNCM439 | Nb | 0.3 | 5 | $7 \times 10^7$ |
| Example 6 | SNCM439 | Ti | 0.2 | 7 | $8 \times 10^7$ |
| Example 7 | SNCM439 | V | 0.2 | 7 | $8 \times 10^7$ |
| Example 8 | SNCM439 | Zr | 0.2 | 6 | $9 \times 10^7$ |
| Example 9 | SNCM439 | Ta | 0.2 | 7 | $8 \times 10^7$ |
| Example 10 | SNCM439 | Hf | 0.2 | 6 | $8 \times 10^7$ |
| Example 11 | SNCM439 | Nb + Zr | 0.2 | 5 | $1 \times 10^8$ |
| Example 12 | Maraging Steel | Nb | 0.2 | 7 | $8 \times 10^7$ |
| Example 13 | SUS630 | Nb | 0.2 | 7 | $8 \times 10^7$ |
| Reference Example 1 | SNCM439 | Nb | 0.005 | 30 | $6 \times 10^5$ |
| Reference Example 2 | SNCM439 | Nb | 0.6 | 5 | $5 \times 10^5$ |

Note that, in Table 1, SNCM439 is nickel-chromium-molybdenum steel and SUS630 is precipitation-hardened stainless steel.

2. Evaluation

Regarding the respective gearings obtained in the above described manufacture, continuous running was performed with input shaft revolutions of 2000 rpm and load torque of 1000 Nm, and the lives (the total input shaft revolutions at which failures occur) were measured. The results are shown in Table 1. Further, the grain sizes (average grain sizes) of the constituent materials of the flexible gears are shown in Table 1.

As clearly known from Table 1, the lives are significantly longer in the respective examples than those in the respective reference examples.

The entire disclosure of Japanese Patent Application No. 2016-231615, filed Nov. 29, 2016 is expressly incorporated by reference herein.

What is claimed is:

1. A robot comprising a flexible gear formed by a ferrous material containing at least one or more kinds of elements of Group 4 elements and Group 5 elements in a range from 0.01 percent by mass to 0.5 percent by mass,
   wherein the flexible gear has a tubular barrel portion and a bottom portion connected to one end part of the barrel portion, and
   the bottom portion has metal flows extending from a center side toward an outer circumference side of the bottom portion.

2. The robot according to claim 1, wherein the ferrous material contains at least one of nickel-chromium-molybdenum steel, maraging steel, and precipitation-hardened stainless steel.

3. The robot according to claim 1, wherein the metal flows extend radially from the center side toward the outer circumference side of the bottom portion.

4. The robot according to claim 1, wherein the barrel portion has metal flows extending from one end part side toward the other end part side of the barrel portion.

5. The robot according to claim 4, wherein the metal flows of the barrel portion extend in directions crossing tooth traces of the flexible gear.

6. The robot according to claim 4, wherein the metal flows of the barrel portion have return portions as seen from a section along an axis line of the barrel portion.

7. The robot according to claim 4, wherein the metal flows of the barrel portion extend from the one end part side toward the other end part side of the barrel portion with direction components along a circumferential direction of the bottom portion.

8. The robot according to claim 4, wherein the metal flows of the barrel portion have portions curving along shapes of tooth surfaces of the flexible gear as seen in a section crossing an axis line of the barrel portion.

9. The robot according to claim 4, wherein the metal flows of the barrel portion connect to the metal flows of the bottom portion.

10. The robot according to claim 1, wherein the metal flows of the bottom portion curve and extend from the center side toward the outer circumference side of the bottom portion.

11. A flexible gear formed by a ferrous material containing at least one or more kinds of elements of Group 4 elements and Group 5 elements in a range from 0.01 percent by mass to 0.5 percent by mass,
    wherein the flexible gear has a tubular barrel portion and a bottom portion connected to one end part of the barrel portion, and
    the bottom portion has metal flows extending from a center side toward an outer circumference side of the bottom portion.

12. A gearing comprising the flexible gear according to claim 11.

* * * * *